(12) United States Patent
Iwai et al.

(10) Patent No.: US 7,278,519 B2
(45) Date of Patent: Oct. 9, 2007

(54) BICYCLE DISK BRAKE PAD WITH FRICTION AND WEAR INDICATING PARTS

(75) Inventors: Toru Iwai, Kitakatsuragi (JP); Yoshikazu Kashimoto, Sakai (JP); Takashi Fujitani, Sakai (JP)

(73) Assignee: Shimano, Inc., Sakai, Osaka (JP)

( * ) Notice: Subject to any disclaimer, the term of this patent is extended or adjusted under 35 U.S.C. 154(b) by 0 days.

(21) Appl. No.: 10/907,794

(22) Filed: Apr. 15, 2005

(65) Prior Publication Data

US 2005/0269175 A1  Dec. 8, 2005

(30) Foreign Application Priority Data

Jun. 8, 2004  (JP) .............................. 2004-169767

(51) Int. Cl.
*F16D 66/02* (2006.01)
(52) U.S. Cl. .......................... 188/1.11 W; 188/251 R; 188/251 A; 188/250 B
(58) Field of Classification Search .......... 188/1.11 W, 188/250 R, 251 R, 252, 253, 255, 256, 251 A, 188/251 M, 250 H, 250 G, 250 B, 73.35, 188/73.36, 73.37, 73.382, 250 D, 250 E
See application file for complete search history.

(56) References Cited

U.S. PATENT DOCUMENTS 3,693,764 A * 9/1972 Anders ...................... 188/73.1
4,433,757 A * 2/1984 Warwick et al. ........ 188/1.11 R
5,413,194 A * 5/1995 Kulis et al. .............. 188/251 A
6,041,893 A * 3/2000 Ervens et al. .......... 188/1.11 W

FOREIGN PATENT DOCUMENTS

| DE | 2949356 A1 | 6/1981 |
|----|------------|--------|
| GB | 708283 | 5/1954 |
| JP | 2779084 B2 | 5/1993 |
| JP | 08-021462 A | 1/1996 |
| JP | 3390117 B2 | 10/1997 |
| JP | 10-087848 A | 4/1998 |
| JP | 11-218164 A | 8/1999 |
| JP | 11-223232 A | 8/1999 |

\* cited by examiner

*Primary Examiner*—Devon Kramer
(74) *Attorney, Agent, or Firm*—James A. Deland

(57) ABSTRACT

A bicycle disk brake pad comprises a backing plate and a friction member. The friction member comprises a friction brake part and a wear indicating part, wherein the friction part is adapted to contact a rotating brake member, and the wear indicating part is mounted to the backing plate. The friction brake part and the wear indicating part each comprise a common material and a harder material that is harder than the common material. A proportion of the harder material in the wear indicating part is greater than a proportion of the harder material in the friction brake part.

22 Claims, 10 Drawing Sheets

BICYCLE DISK BRAKE PAD WITH FRICTION AND WEAR INDICATING PARTS

BACKGROUND OF THE INVENTION

The present invention is directed to bicycles and, more particularly, to a bicycle disk brake pad.

Disk brake pads normally pinch a disk brake rotor that rotates along with the wheel in order to brake the wheel. Resin pads are known examples of conventional disk brake pads. Such pads are shown in Japanese Unexamined Patent Application (Kokai) 6-74267. As shown in that reference, resin pads may comprise a backing plate and a friction member attached to the backing plate by an adhesive. The friction member may comprise several powdered elements joined together by a synthetic resin binder. When the friction member wears down to the backing plate, the backing plate contacts the disk brake rotor and makes noise, thus warning the user that the friction member is worn. Unfortunately, such contact between the backing plate and the rotor also can damage or essentially destroy the rotor, since the backing plate usually is made of the same material as the rotor.

SUMMARY OF THE INVENTION

The present invention is directed to various features of a disk brake pad. In one embodiment, a bicycle disk brake pad comprises a backing plate and a friction member. The friction member comprises a friction brake part and a wear indicating part, wherein the friction part is adapted to contact a rotating brake member, and the wear indicating part is mounted to the backing plate. The friction brake part and the wear indicating part each comprise a common material and a harder material that is harder than the common material. A proportion of the harder material in the wear indicating part is greater than a proportion of the harder material in the friction brake part. Additional inventive features will become apparent from the description below, and such features may be combined with the above features to provide additional benefits.

DETAILED DESCRIPTION OF THE EMBODIMENTS

Figure 1:
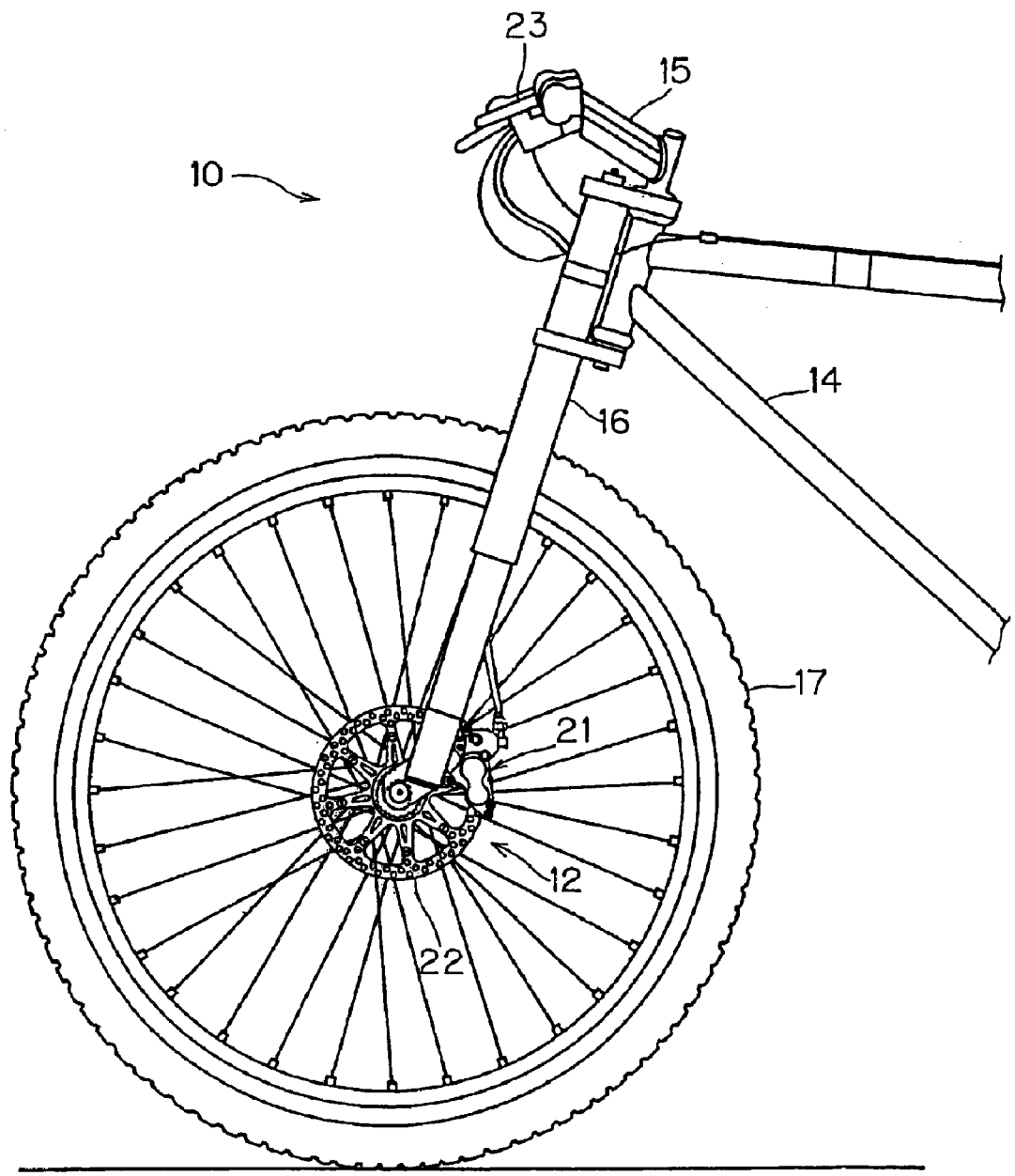
FIG. 1 is a side view of a bicycle with a particular embodiment of a disk brake apparatus.

FIG. 1 is a side view of a bicycle 10 with a particular embodiment of a complete disk brake apparatus 12. Bicycle 10 is a conventional bicycle with a frame 14 supporting a handlebar 15, front and rear forks 16 (only the front fork is shown), front and rear wheels 17 (only the front wheel is shown), and a drive device comprising a sprocket and chain (not shown). Since the structure of such a conventional bicycle is well known in the field, further description if its structure shall be omitted.

Disk brake apparatus 12 comprises a brake caliper 21 mounted on front fork 16, a brake rotor 22 attached to a hub 17a of front wheel 17 so that brake rotor 22 rotates integrally with front wheel 17, and a brake operating mechanism 23. Brake caliper 21 is attached to front fork 16 near brake rotor 22, and it applies a frictional force to brake rotor 22 in response to the operation of brake operating mechanism 23 to stop the rotation of brake rotor 22 and front wheel 17. Brake rotor 22 comprises a centrally disposed hub mounting member 22a attached to hub 17a and a ring-shaped rotor member 22b for contacting brake pads 76.

Figure 2:
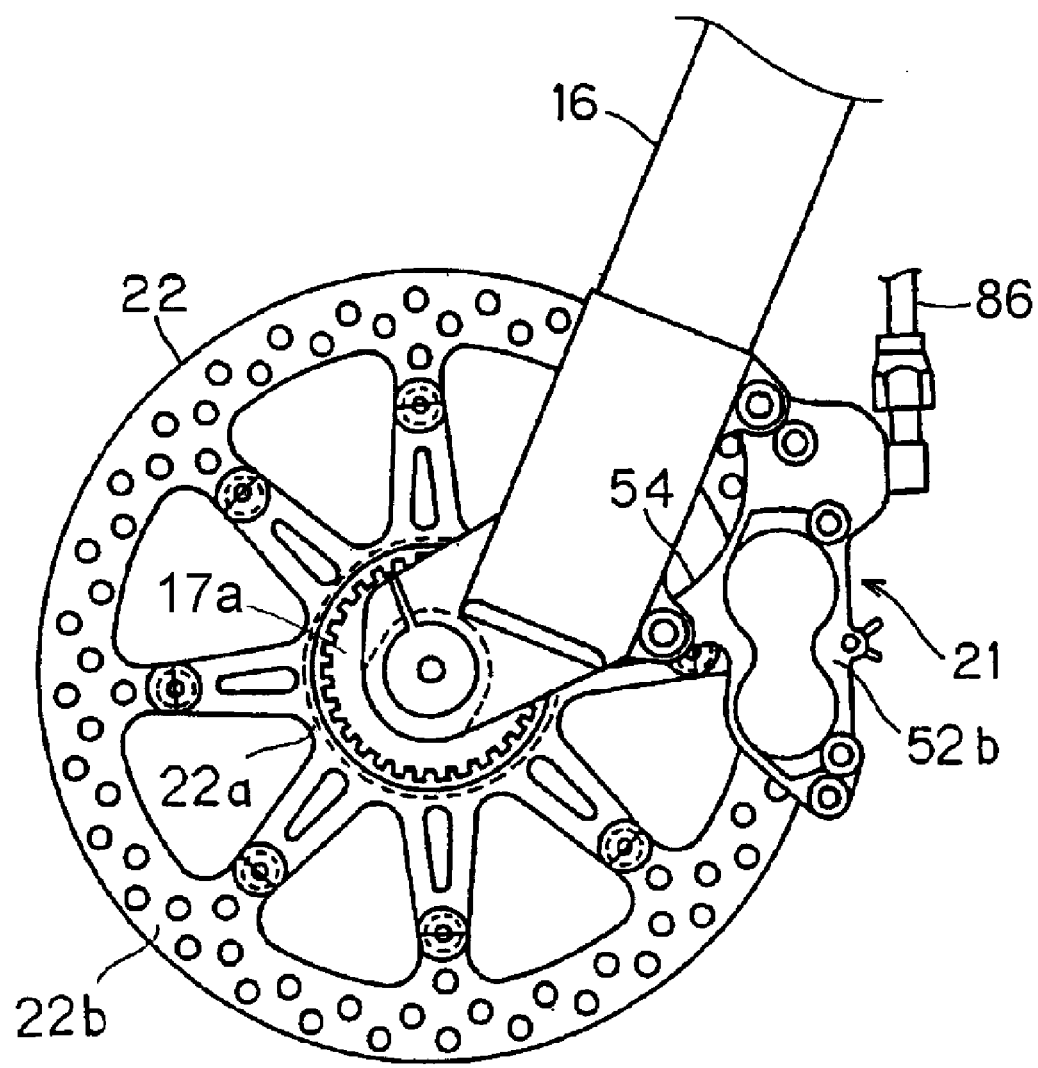
FIG. 2 is a side view of the disk brake apparatus.
Figure 3:
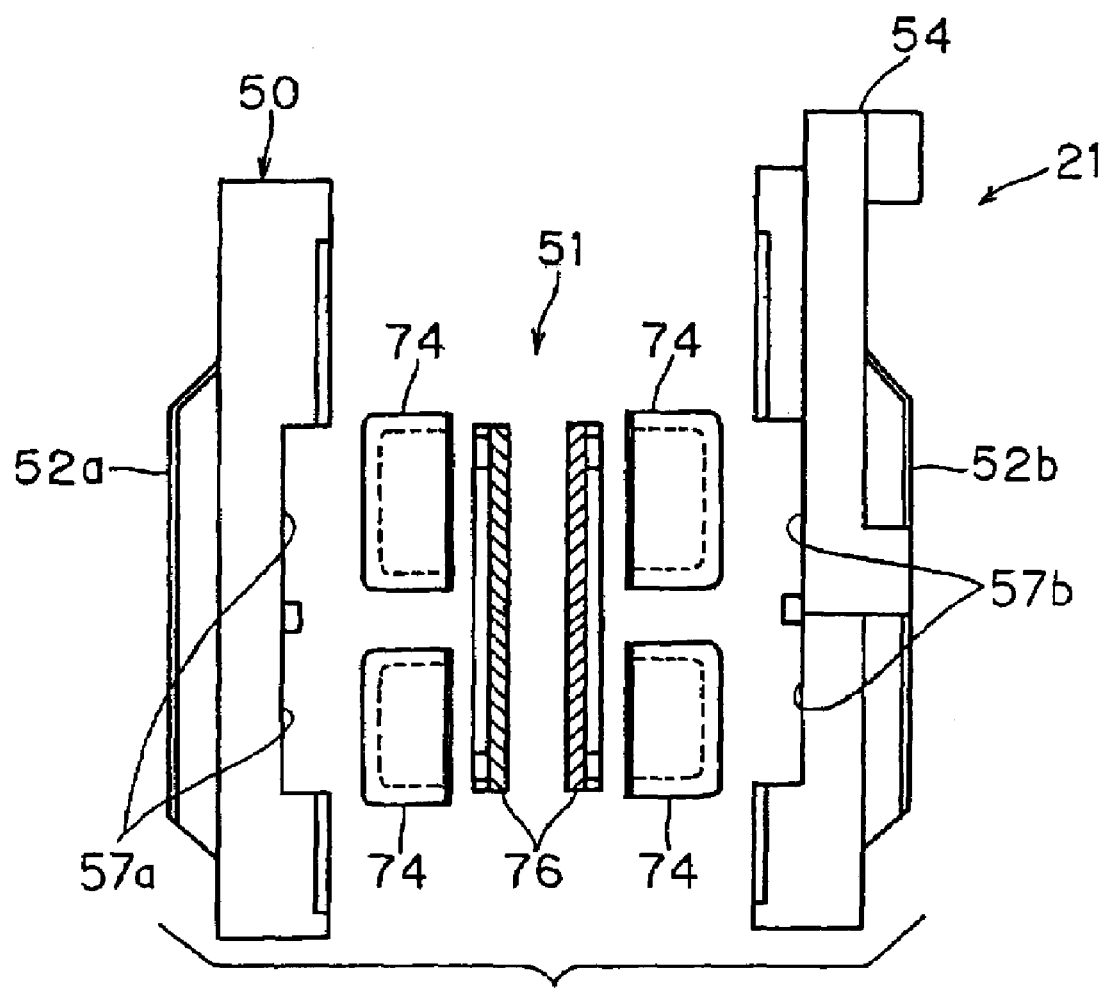
FIG. 3 is an exploded schematic view of the brake caliper assembly.

As shown in FIGS. 2 and 3, brake caliper 21 comprises a housing 50 and a piston unit 51. Housing 50 is constructed of a thermally conducting material such as an aluminum alloy, and it comprises a first housing member 52a and a second housing member 52b bolted together in a conventional manner to form a slot to receive brake rotor 22 therebetween. Housing members 52a and 52b have substantially the same shape, except that hydraulic tubing 86 for brake operating mechanism 23 is connected to second housing member 52b to supply brake oil to both housing members 52a and 52b. Second housing member 52b also has an outwardly extending flange that forms an attachment member 54 for bolting brake caliper 21 to front fork 16.

As shown in FIG. 3, piston unit 51 comprises four pistons 74 and a pair of brake pads 76. Pistons 74 slideably fit into round cylinders 57a and 57b formed in housing members 52a and 52b so as to move between a brake release position and a braking position. Brake pads 76 move integrally with pistons 74. Thus, when pistons 74 move from the brake release position to the braking position, the brake pads 76 also move from the brake release position to the braking position. When in the braking position, brake pads 76 press against and apply a frictional force to brake rotor 22 to thereby decrease or stop rotation of brake rotor 22 and front wheel 17. When in the brake release position, the brake pads 76 are spaced apart from brake rotor 22, thus allowing brake rotor 22 and front wheel 17 to freely rotate.

Figure 4:
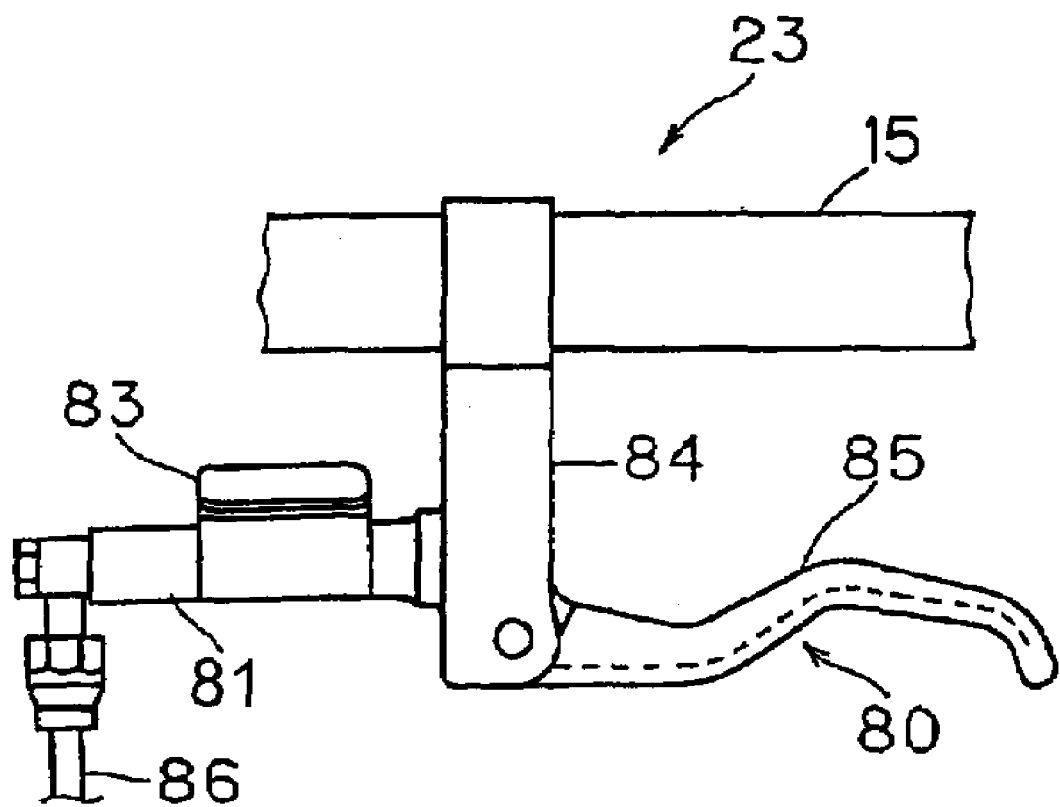
FIG. 4 is a plan view of a particular embodiment of a brake operating device.
Figure 5:
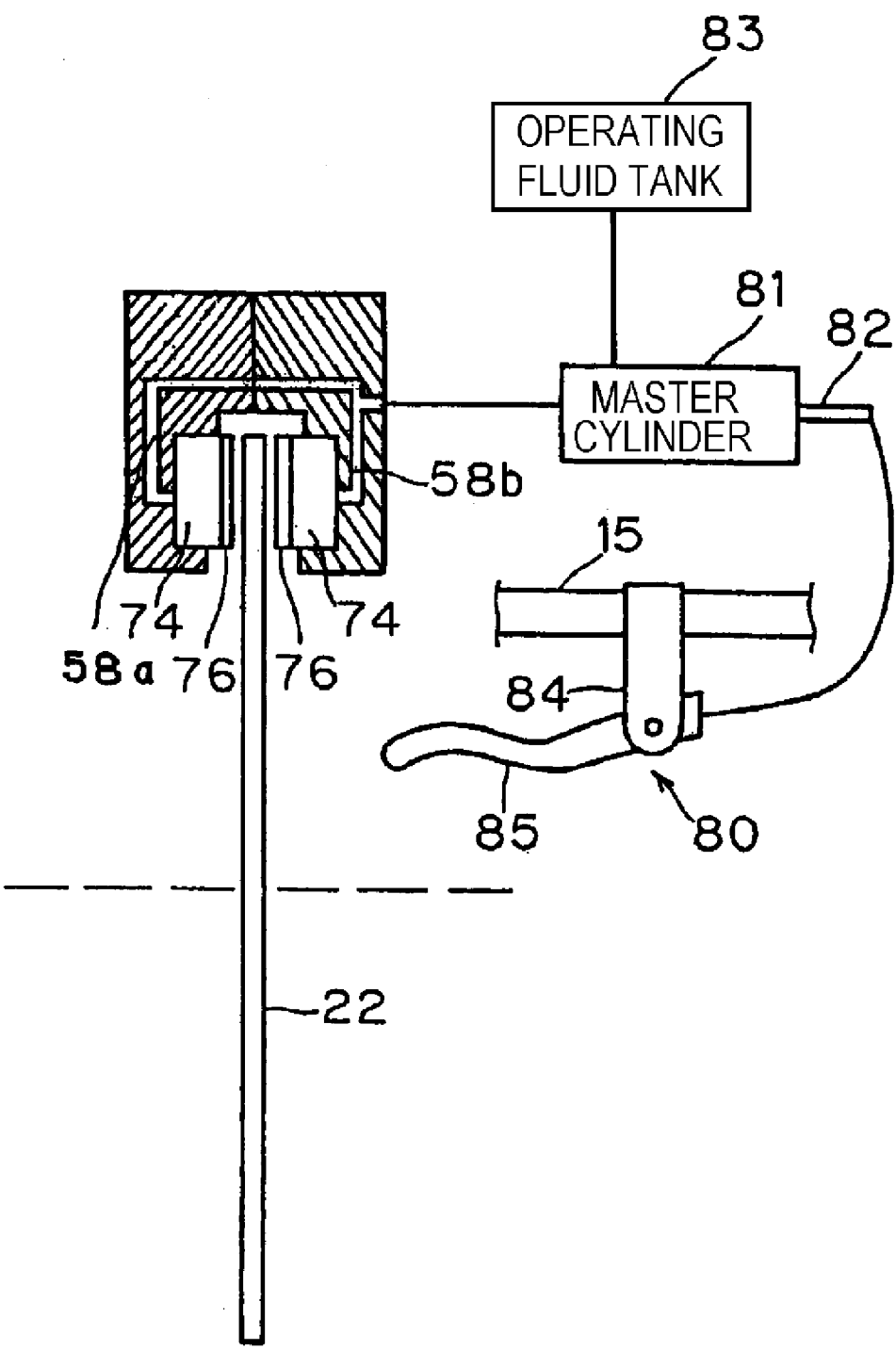
FIG. 5 is a schematic diagram of a particular embodiment of a hydraulic circuit for the disk brake apparatus.

As shown in FIGS. 4 and 5, the brake operating mechanism 23 is attached to handlebar 15. Brake operating mechanism 23 comprises a brake lever assembly 80, a master cylinder 81, a piston 82, and an operating fluid tank 83. Brake lever assembly 80 comprises a bracket 84 mounted on handlebar 15 and a lever component 85 pivotably mounted on bracket 84. Bracket 84 is integrally formed with master cylinder 81, and piston 82 and operating fluid tank 83 are supported by bracket 84. Piston 82 is slidingly disposed within master cylinder 81, and operating fluid tank 83 is in fluid communication with master cylinder 81. One end of piston 82 is connected to lever component 85 so that piston 82 reciprocates inside master cylinder 81 in response to the pulling and releasing of lever component 85. Pulling lever component 85 causes pressurized oil to move through the hydraulic tubing 86 connected to brake caliper 21, the pressurized oil moves pistons 74, brake pads 76 contact and apply frictional force to brake rotor 22, and the front wheel 17 is braked.

Figure 6:
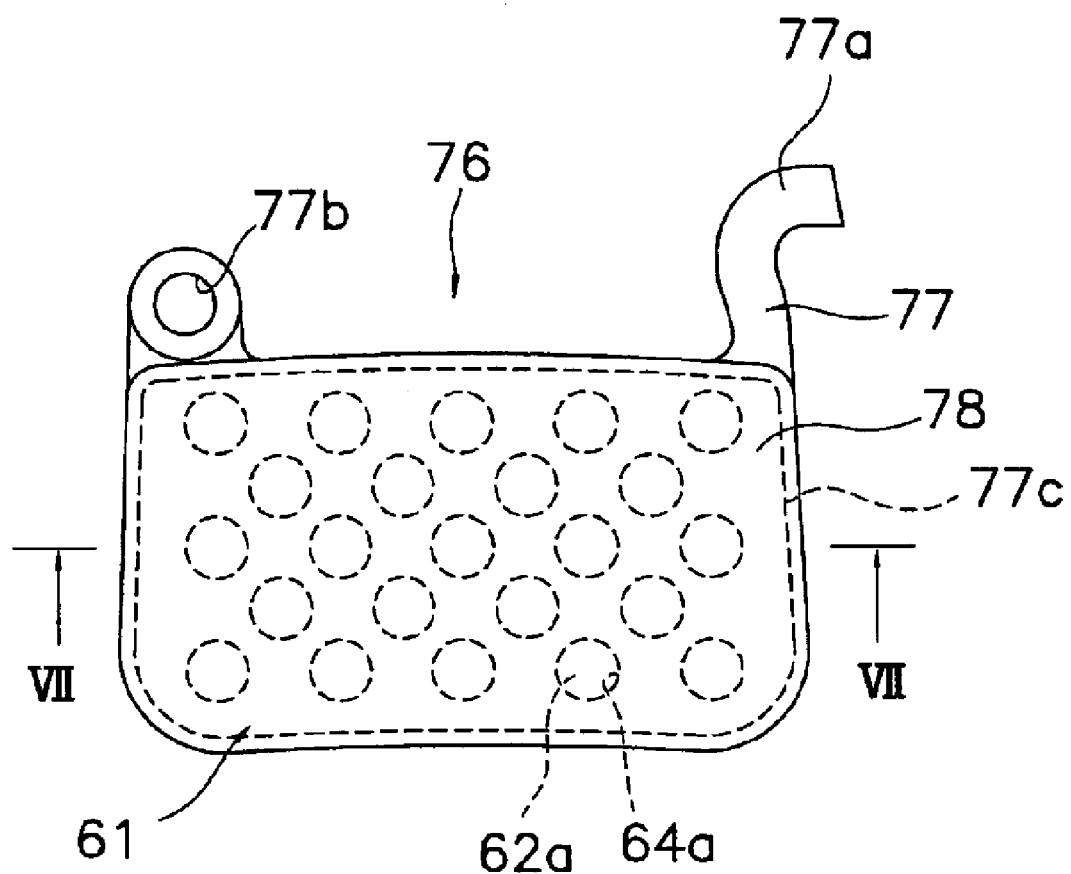
FIG. 6 is a plan view of a particular embodiment of a brake pad.
Figure 7:
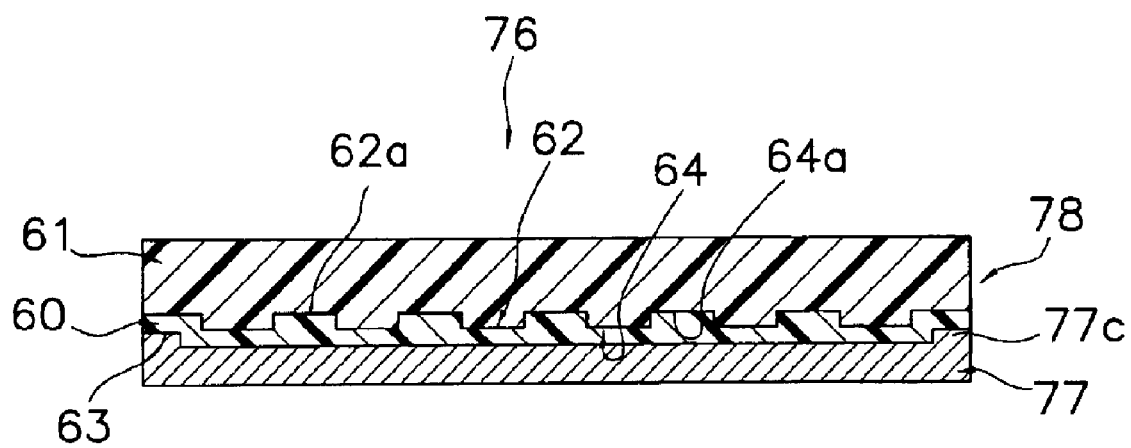
FIG. 7 is a view taken along line VII-VII in FIG. 6.

Brake pads 76 are resin pads. As shown in FIGS. 6 and 7, a friction member 78, comprising a metal powder joined together by a synthetic resin binder, is mounted to backing plate 77 by means of an adhesive. Backing plate 77 may comprise a stainless steel sheet having a thickness in the range of from approximately 1.5 mm to approximately 1.8 mm thick. Backing plate 77 includes a hook-shaped detent 77a and a round support 77b, both of which are slideably supported by first and second housing members 52a and 52b. Backing plate 77 also has convex parts 77c in the form on a continuous protrusion that protrudes toward friction member 78 and extends along the periphery of backing plate 77.

Friction member 78 comprises a hard wear indicating part 60 and a friction brake part 61, wherein wear indicating part 60 is laminated onto back plate 77, and friction brake part 61 is laminated onto wear indicating part 60. The surface of friction brake part 61 comes into contact with disk rotor 22 to brake front wheel 17. Friction member 78 may have a thickness in a range of from approximately 2.0 mm to approximately 2.5 mm. The thickness ratio between wear indicating part 60 and friction brake part 61 may be in the range of from approximately 1:3 to approximately 1:1. A concavo-convex part 62 comprising a plurality of columnar protrusions 62a is formed at the junction of wear indicating part 60 and friction brake part 61. Similarly, a concavo-convex part 64 comprising a plurality of recesses 64a is formed at the junction of wear indicating part 60 and friction brake part 61. Protrusions 62a formed in wear indicating part 60 engage recesses 64a formed in friction brake part 61 to enhance the coupling between wear indicating part 60 and friction brake part 61, thereby minimizing the possibility that friction brake part 61 will shear off of wear indicating part 60, and to help indicate wear of friction brake part 61 in a manner described below. Wear indicating part 60 also includes notches 63 in the form of a continuous recess that engages convex parts 77c in backing plate 77 to enhance the coupling between wear indicating part 60 and backing plate 77, thereby minimizing the possibility that wear indicating part 60 will shear off of backing plate 77.

Wear indicating part 60 and friction brake part 61 are constructed such that wear indicating part 60 has a higher proportion of hard components. For example, as shown in Table 1, which provides percent by mass, the proportion of dichromium trioxide is higher in wear indicating part 60 than in friction brake part 61. Conversely, wear indicating part 60 has fewer non-dichromium trioxide components than friction brake part 61. Thus, wear indicating part 60 is harder than friction brake part 61 and will produce a warning noise with fewer components.

TABLE 1

| | Friction Brake Part | Wear Indicating Part |
|---|---|---|
| Silicon Carbide | 10-20 | |
| Dichromium Trioxide | 2.7 or less | 10-30 |
| Graphite | 10 or less | |
| Tin and Tin-Based Compounds | 10 or less | |
| Copper and Copper-Based Compounds | 30-40 | |
| Silica | 10 or less | |
| Synthetic Resin (binder) | Remainder | |

As a result of this structure, when the harder wear indicating part 60 presses against the rotating disk rotor 22, it produces a louder sound than when the softer friction brake part 61 alone presses against the rotating disk rotor 22. The sound further increases when protrusions 62a are completely worn down and only wear indicating part 60 contacts the rotating disk rotor 22. Thus, wear indicating part 60 warns the rider that friction member 78 is worn. Furthermore, the additional noise does not mean that backing plate 77 is contacting disk rotor 22, so damage to disk rotor 22 may be avoided.

Figure 8:
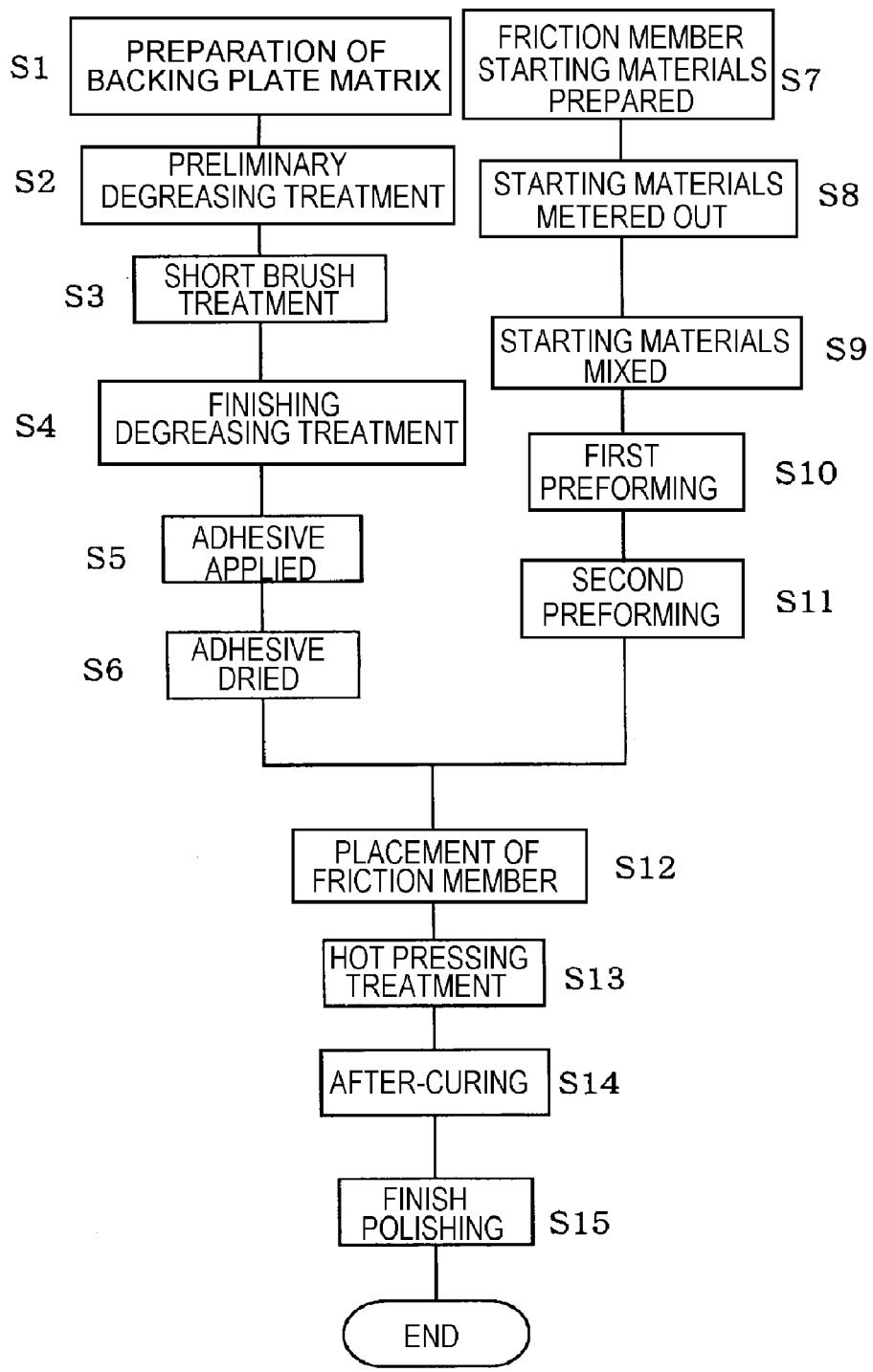
FIG. 8 is a flow chart of a particular embodiment of a method of fabricating the brake pad.
Figure 9A:
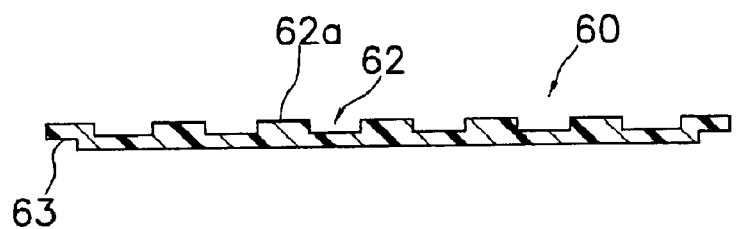
FIGS. 9A-9C are cross sectional views of the brake pad during fabrication.
Figure 9B:
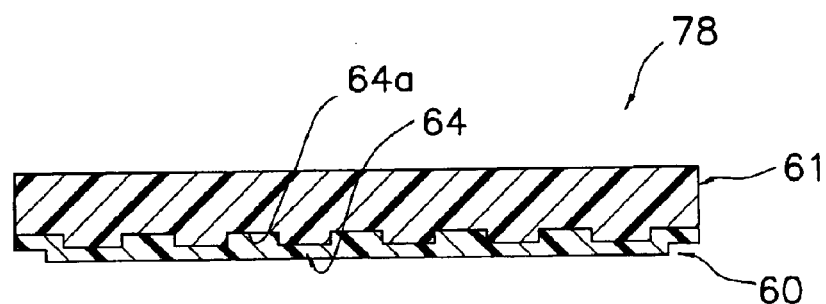
Figure 9C:
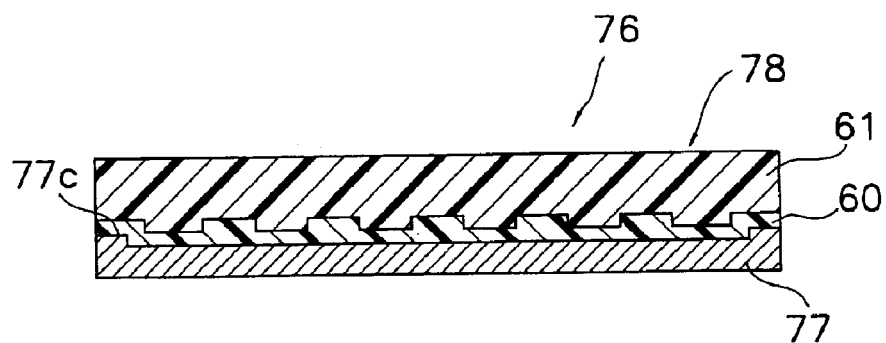

FIG. 8 is a flow chart of a particular embodiment of a method of fabricating brake pad 76, and FIGS. 9A-9C are cross sectional views of brake pad 76 during fabrication. As shown in FIG. 8, in Step S1, a stainless steel alloy sheet with convex parts 77c formed on it is prepared as the matrix for backing plate 77. In Step S2, a preliminary degreasing treatment is performed using a rotating washing machine, for example, to remove dirt from the front and back of the sheet. In Step S3, a short brush treatment is performed on the surface of the sheet to facilitate the adhesion of the adhesive. In Step S4, a finishing degreasing treatment is performed using a rotating washing machine to remove dirt after the short brush treatment. In Step S5, a phenolic resin adhesive, for example, is applied to the surface where friction member 78 will be joined to backing plate 77. In Step S6, the adhesive is allowed to dry naturally for about 1 day, for example.

Meanwhile, in Step S7, the starting materials for friction member 78 are prepared. In Step S8, the starting materials are metered to provide the proportion of components shown in Table 1. In Step S9, the starting materials are mixed to homogeneity using a lodge mixer or the like. In Step S10, a first performing process is performed to perform the part that will become the wear indicating part 60 shown in FIG. 9A. At this stage, a concavo-convex part 62 with protrusions 62a is formed at the surface where wear indicating part 60 will be joined to friction brake part 61, and notches 63 are formed at the surface of wear indicating part 60 where it will be joined to backing plate 77. In Step S11, a second performing process is performed by placing friction brake part 61 on wear indicating part 60 so that it covers wear indicating part 60, and concavo-convex part 64 with depressions 64a is formed in friction brake part 61 as shown in FIG. 9B. The surface of friction brake part 61 is formed smooth.

In Step S12, friction member 78 is placed on back plate 77. In Step S13, friction member 78 is hot pressed against backing plate 77 using a press. The hot pressing can be done, for example, for approximately 8 minutes at approximately 175° C. at a pressure of approximately 300 kgf/cm$^2$ to fix friction member 78 to backing plate 77. In Step S14, the parts are after-cured for approximately 10 minutes at approximately 200° C. in an electrical furnace to ensure that the synthetic resin serving as the binder for friction member 78 is completely dissolved and solidified. In Step S15, the surface of friction member 78 is smoothed and polished to a uniform thickness, thus producing a final product in the form of the disk brake pad 78 illustrated in FIG. 9C.

Figure 10:
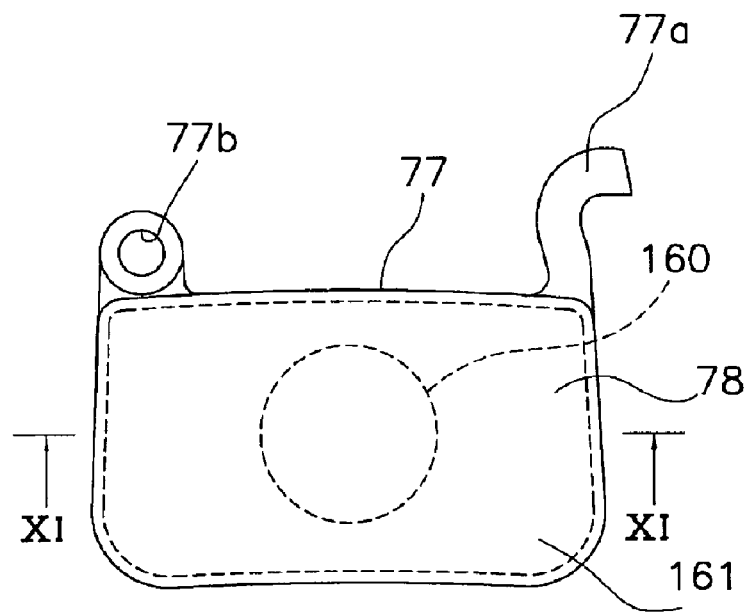
FIG. 10 is a plan view of another embodiment of a brake pad.
Figure 11:
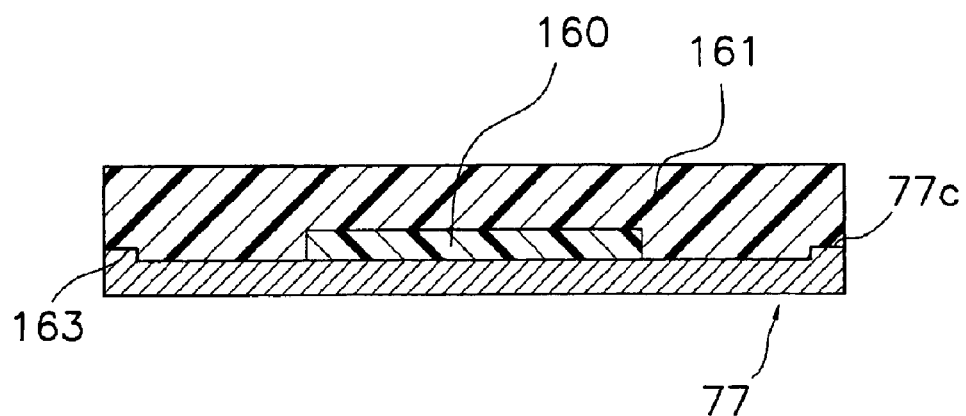
FIG. 11 is a view taken along line XI-XI in FIG. 10.

While the above is a description of various embodiments of inventive features, further modifications may be employed without departing from the spirit and scope of the present invention. For example, while a plurality of protrusions and depressions were formed between wear indicating part 60 and friction brake part 61 in the embodiment described above, other configurations are possible. For example, as shown in FIGS. 10 and 11, a wear indicating part 160 may be formed in the shape of a round cylindrical plate, for example, in the center of backing plate 77, and a friction braking part 161 may be joined to wear indicating art 160 and backing plate 77 so as to cover wear indicating part 160. In this case, notches 163 that engage protrusions 77c on backing plate 77 may be formed on friction brake part 161. The centrally disposed wear indicating part 160 helps to conserve the original braking characteristic while still providing the appropriate warning.

While protrusions 77c were provided as a continuous structure along the entire periphery of backing plate 77, such protrusions may be provided in discrete parts. Also, concavo-convex parts also may be provided in areas other than the periphery of backing plate 77. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle disk brake pad comprising:
   a backing plate; and
   a friction member, wherein the friction member includes:
      a friction brake part adapted to contact a rotating brake member; and
      a wear indicating part mounted to the backing plate;
      wherein the wear indicating part is shaped relative to the friction brake part to create an audible sound when the wear indicating part is exposed upon wear of the friction brake part, wherein the audible sound increases as a result of increasing the exposed area of the wear indicating part upon further wear of the friction brake part;
      wherein the wear indicating part includes one of a plurality of projections or recesses that engage another one a plurality of projections or recesses disposed in the friction brake part;
      wherein the wear indicating part comprises a softer material than the backing plate;
      wherein the friction brake part and the wear indicating part each comprises:
         a common material; and
         a harder material that is harder than the common material;
         wherein a proportion of the harder material in the wear indicating part is greater than a proportion of the harder material in the friction brake part.

2. The brake pad according to claim 1 wherein the wear indicating part is laminated onto the backing plate.

3. The brake pad according to claim 1 wherein the wear indicating part is laminated onto the friction brake part.

4. The brake pad according to claim 1 wherein the wear indicating part is laminated onto the backing plate, and wherein the wear indicating part is laminated onto the friction brake part.

5. The brake pad according to claim 1 wherein the backing plate includes one of a backing plate projection or a backing plate recess that engages the other one of a wear indicating part projection or a wear indicating part recess in the wear indicating part.

6. The brake pad according to claim 5 wherein the one of the backing plate projection or the backing plate recess is disposed along an outer peripheral surface of the backing plate.

7. The brake pad according to claim 6 wherein the one of the backing plate projection or the backing plate recess is the backing plate projection, wherein the one of the wear indicating part projection or the wear indicating part recess is the wear indicating part recess, and wherein the backing plate projection is disposed along the outer peripheral surface of the backing plate for engaging the wear indicating part recess in the wear indicating part.

8. The brake pad according to claim 1 wherein the wear indicating part is mounted at substantially a center of the backing plate, and wherein the friction brake part is mounted to the wear indicating part so as to cover the wear indicating part.

9. The brake pad according to claim 8 wherein the friction brake part completely covers the wear indicating part when viewed from an upper surface of the friction brake part.

10. The brake pad according to claim 8 wherein the backing plate includes a backing plate projection that engages a wear indicating part recess in the wear indicating part, and wherein the wear indicating part includes a wear indicating part projection that engages a friction brake part recess in the friction brake part.

11. The brake pad according to claim 10 wherein the backing plate projection is disposed along an outer peripheral surface of the backing plate, and wherein the wear indicating part projection is disposed along an outer peripheral surface of the wear indicating part.

12. The brake pad according to claim 1 wherein the backing plate includes one of a plurality of backing plate projections and backing plate recesses that engage another one of a plurality of wear indicating part projections and wear indicating part recesses disposed in the wear indicating part.

13. The brake pad according to claim 1 wherein the harder material comprises a metal.

14. The brake pad according to claim 1 wherein the harder material comprises dichromium trioxide.

15. The brake pad according to claim 1 wherein the harder material comprises a silica.

16. The brake pad according to claim 1 wherein the harder material comprises dichromium trioxide and a silica.

17. The brake pad according to claim 16 wherein the backing plate includes one of a plurality of backing plate projections and backing plate recesses that engage another one of a plurality of wear indicating part projections and wear indicating part recesses disposed in the wear indicating part.

18. The brake pad according to claim 17 wherein the wear indicating part is laminated onto the backing plate.

19. The brake pad according to claim 18 wherein the wear indicating part is laminated onto the friction brake part.

20. The brake pad according to claim 1 wherein the plurality of projections or recesses of the wear indicating part project or recess from an immediately adjacent surface of the wear indicating part.

21. The brake pad according to claim 1 wherein the audible sound increases without wearing the backing plate.

22. The brake pad according to claim 1 wherein the backing plate, the friction brake part and the wear indicating part each is a separate part.

* * * * *